United States Patent
Korotkov et al.

(10) Patent No.: US 6,856,554 B2
(45) Date of Patent: Feb. 15, 2005

(54) MEMORY SYSTEM

(75) Inventors: Konstantin Korotkov, München (DE); Maksim Kuzmenka, München (DE)

(73) Assignee: Infineon Technologies AG, Munich (DE)

( * ) Notice: Subject to any disclaimer, the term of this patent is extended or adjusted under 35 U.S.C. 154(b) by 68 days.

(21) Appl. No.: 10/439,085

(22) Filed: May 15, 2003

(65) Prior Publication Data

US 2004/0008545 A1 Jan. 15, 2004

(30) Foreign Application Priority Data

Jul. 15, 2002 (EP) ............................................ 02015608

(51) Int. Cl.⁷ .............................................. G11C 16/04
(52) U.S. Cl. ................................ 365/189.05; 365/189.08
(58) Field of Search ........................ 365/189.05, 189.08, 365/233, 230.03

(56) References Cited

U.S. PATENT DOCUMENTS

| | | | |
|---|---|---|---|
| 5,903,167 A | 5/1999 | Sanwo et al. | |
| 6,028,781 A | 2/2000 | Vogley et al. | |
| 6,333,890 B1 * | 12/2001 | Niimi et al. | 369/13.43 |
| 6,338,113 B1 | 1/2002 | Kubo et al. | |
| 6,349,051 B1 | 2/2002 | Klein | |
| 6,393,541 B1 * | 5/2002 | Fujii | 711/167 |
| 6,414,891 B2 * | 7/2002 | Kuge et al. | 365/205 |
| 2002/0083255 A1 | 6/2002 | Greeff et al. | |

FOREIGN PATENT DOCUMENTS

| | | |
|---|---|---|
| WO | 00/01207 | 1/2000 |
| WO | 00/75796 A1 | 12/2000 |

* cited by examiner

*Primary Examiner*—Anh Phung
(74) *Attorney, Agent, or Firm*—Laurence A. Greenberg; Werner H. Stemer; Gregory L. Mayback

(57) ABSTRACT

A memory system has a memory controller, a plurality of memory modules and a memory bus connected to the memory controller and branching into a plurality of sub-busses, each of which is connected to a memory module. A sub-bus has a diode associated therewith for isolating a memory module connected to that sub-bus from the memory bus.

8 Claims, 7 Drawing Sheets

MEMORY SYSTEM

BACKGROUND OF THE INVENTION

1. Field of the Invention

The present invention relates to a memory system and, in particular, to a memory system comprising a memory controller, a plurality of memory modules and a memory bus (data bus) connected to the memory controller and branching into a plurality of sub-busses, each of which is connected to one of the memory modules.

2. Description of Prior Art

The conventional structures of memory systems or memory subsystems include a memory controller and a data bus by which the memory controller is connected to a plurality of memory modules, usually from 2 (desktops) to 8 (servers). To this end, the data bus branches in a plurality of sub-busses, each of which is connected to one of the memory modules and, on the module, to one or more memory chips/devices. In operation, memory access, such as reading or writing, involves only one active module. The other modules are deactivated during access to the active module making use of stub resistors and/or field effect transistor (FET) switches.

In prior art memory systems of the above kind, parasitic parameters of the non-active modules restrict the bandwidth of the bus and/or the number of connected memory modules. The parasitic parameters include the input capacitance of the non-active modules and parasitic effects caused by unterminated trace stubs which cause reflections. Thus, the data rate in the data bus of prior art memory sub-systems, which include more than one memory module, is restricted due to the influence of the parasitic parameters of non-active module(s).

SUMMARY OF THE INVENTION

It is the object of the present invention to provide a memory system having a plurality of memory modules, which can be operated at high data rates.

The present invention is a memory system having:

a memory controller;

a plurality of memory modules;

a memory bus connected to the memory controller and branching into a plurality of sub-busses, each of which is connected to a memory module, wherein a sub-bus has a diode associated therewith for isolating a memory module connected to that sub-bus from the memory bus.

The present invention is based on the finding that diodes can be advantageously used in order to activate modules of a memory system which are accessed and to keep modules which are not accessed deactive. To this end, respective diodes can be placed into each sub-bus and a reverse bias or a zero bias can be applied thereto in order to disconnect inactive modules from the memory bus. The reverse bias can be provided by respective drivers of the memory modules. A forward bias at least in the order of the on-state-voltage of the diode can be applied to the diode placed in the sub-bus of an active module to permit reading and/or writing of data from and/or onto that module. Again, the forward-bias can be provided by respective drivers of the memory modules.

In other words, the present invention provides a diode-switchable data bus for memory systems or memory sub-systems, where memory modules are connected to the memory bus through diodes. Diodes placed in sub-busses associated with non-active modules are reverse biased or zero voltage biased, so that due to the low diode capacitance, influence of non-active devices on the common part of the memory bus is negligible. Forward-biasing the diode associated with the active memory modules leaves the active module connected to the memory controller in a similar way as in point-to-point systems in which each memory module is connected to the memory controller directly without a common memory bus.

The present invention allows for an improved performance when compared to conventional solutions making use of stub resistors and FET switches since reverse-biased diodes or zero voltage biased diodes show a very low capacitance. In addition, the diodes which are used according to the present invention do not represent additional costs when compared to prior art solutions in view of the low cost thereof in comparison to the field-effect transistor switches used according to the prior art. Commercial diodes which can be used for the present invention have a price comparable to that of resistors. Moreover, the switchable data-bus of the memory system with diode isolation according to the invention is applicable for high-speed data transfers, in the range of 500 to 600 Mbit/sec or up to 1.333 Mbit/sec, for example.

BRIEF DESCRIPTION OF THE DRAWINGS

Preferred embodiments of the present invention are described hereinafter making reference to the appended drawings, in which.

DETAILED DESCRIPTION OF PREFERRED EMBODIMENTS

Figure 1:
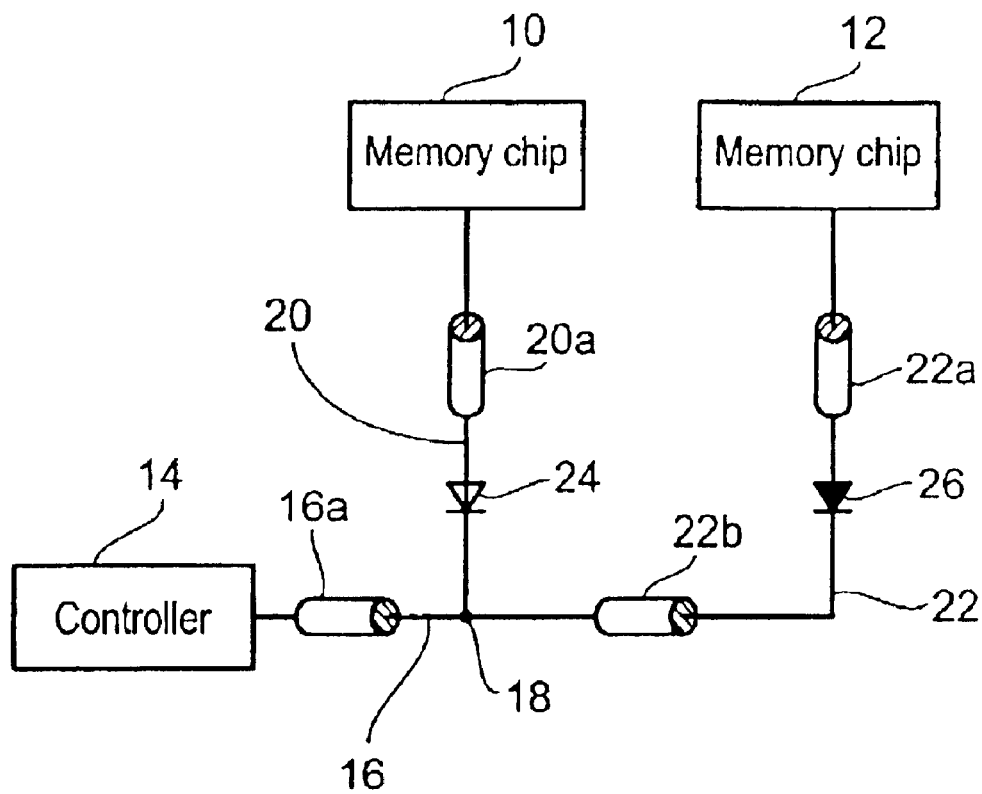
FIG. 1 shows a schematic view of a memory architecture embodying the present invention.

FIG. 1 shows a memory architecture representing a memory system or memory sub-system according to the invention. The memory system comprises a plurality of memory modules 10, 12 which are formed, for example, by memory chips as indicated in FIG. 1. The memory system further comprises a memory controller 14 through which access to the memory chips 10, 12 is managed. The memory controller 14 is connected to a common memory bus 16, the memory's data-bus, for example. At a node 18, the common memory data-bus 16 branches into two sub-busses 20 and 22 which are connected to the memory chips 10 and 12, respectively. In the Figs., line-lengths of respective portions of the bus 16 and the sub-busses 20 and 22 are indicated by cylindrical symbols 16a, 20a, 22a and 22b.

According to the invention, the sub-busses 20 and 22 include diodes 24 and 26. By applying a reverse bias to the diodes 24 and 26, the memory chips 10 and 12 can be isolated from the common memory bus 16. In FIG. 1, diode 24 is shown as a reverse-biased or a zero voltage biased diode, so that the memory chip 10 is isolated from the common memory bus 16 and represents a non-active memory module. Contrary thereto, the diode 26 is represented as a forward-biased diode (indicated by the filled-in symbol), so that the memory chip 12 represents an active module.

For reverse-biasing the diode 24, an appropriate voltage drop of, for example, −5 V is caused between the anode and the cathode of the diode. Alternatively, it can be sufficient not to reverse bias the diode in order to isolate a non-active module from the memory bus in case diodes are use which have a low capacitance without applying a reverse bias, i.e. at 0V. Dependent on the kind of diodes used, an appropriate positive voltage drop between 0 and 2.5 V, for example, is caused between the anode and the cathode of the diode for forward-biasing same in order to bring the diode in a conductive on-state.

The diagram of FIG. 1 represents a possible data-bus topology for a memory system, wherein the line length 16a of the common data-bus 16 can be 127 mm and the line lengths 20a, 22a and 22b can be 12.7, for example.

Figure 2:
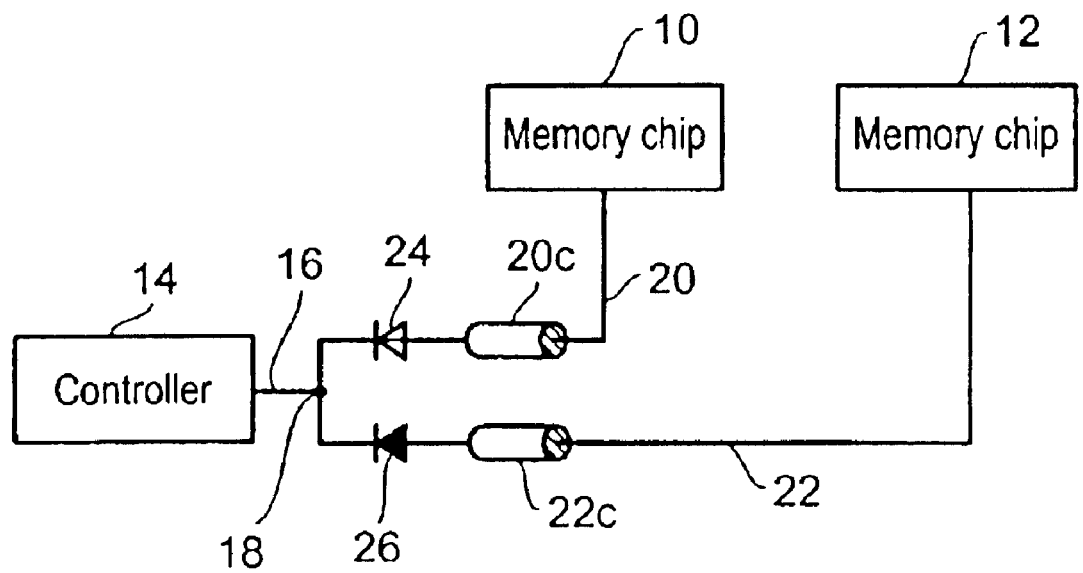
FIG. 2 shows a schematic view of an alternative memory architecture embodying the present invention.

An alternative data-bus topology is shown in FIG. 2, wherein the diodes 24 and 26 in both sub-busses 20 and 22 are placed adjacent to the branching node 18. In the embodiment shown in FIG. 2, the line length of the sub-bus 20 as indicated by the cylindrical symbol 20c can be 127 mm and the line length of the sub-bus 22 as indicated by the symbol 22c can be 142 mm.

Figure 3A:
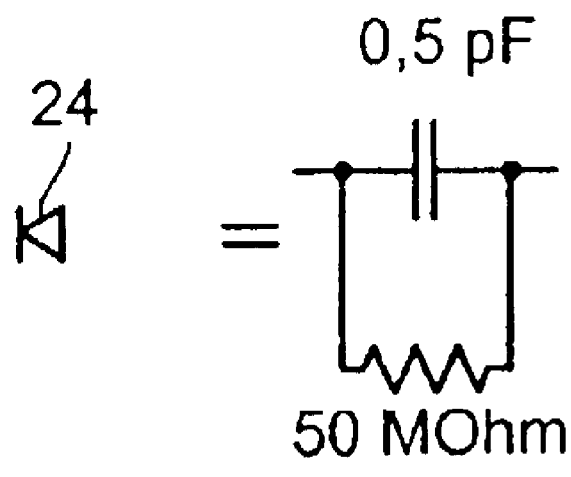
FIGS. 3a and 3b show simplified equivalent diagrams of a typical low power switching reverse biased diode and a forward-biased diode.
Figure 3B:
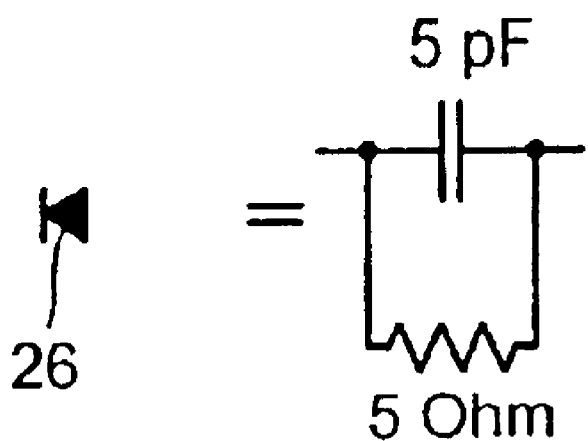

FIGS. 3a and 3b show a simplified model of low-signal diodes in case of a reverse-bias applied thereto (diode 24) and in case of a forward-bias applied thereto (diode 26). The reverse-biased diode can be modelled as a parallel circuit of a high-resistance of about 50 MOhm and a low capacitance of about 0.5 pF. The forward-biased diode 26 represents a parallel circuit of a low resistance of about 5 Ohm and a high capacitance of about 5 pF. Thus, a respective forward-bias causes a current flow through the diode 26 dependent on the characteristics of the diode used. For low-power Shottky diodes, the current flow through the diode is about 10 mA for a forward-bias of about 0.5 V.

It is clear from FIG. 3a that the reverse-biased diode represents a very low capacitance and a very high current resistance. Thus, stub traces and input chip capacitances of non-active modules can be isolated from the common memory bus by the low capacitance of the reverse-biased diode. Thus, the read-write signal path for each active diode becomes similar to same of a point-to-point connection.

The values of the capacitance and the resistances for the reverse-biased diode and the forward-biased diode will vary according to the characteristics of a respective diode used. However, it is a common feature of diodes, pn-diodes and Shottky diodes, for example, that same manifest a low capacitance and high resistance when in a non-conducting state, i.e. in a reverse-biased or not biased state. Thus, any diode having such a characteristic can be used according to the invention.

Figure 4:
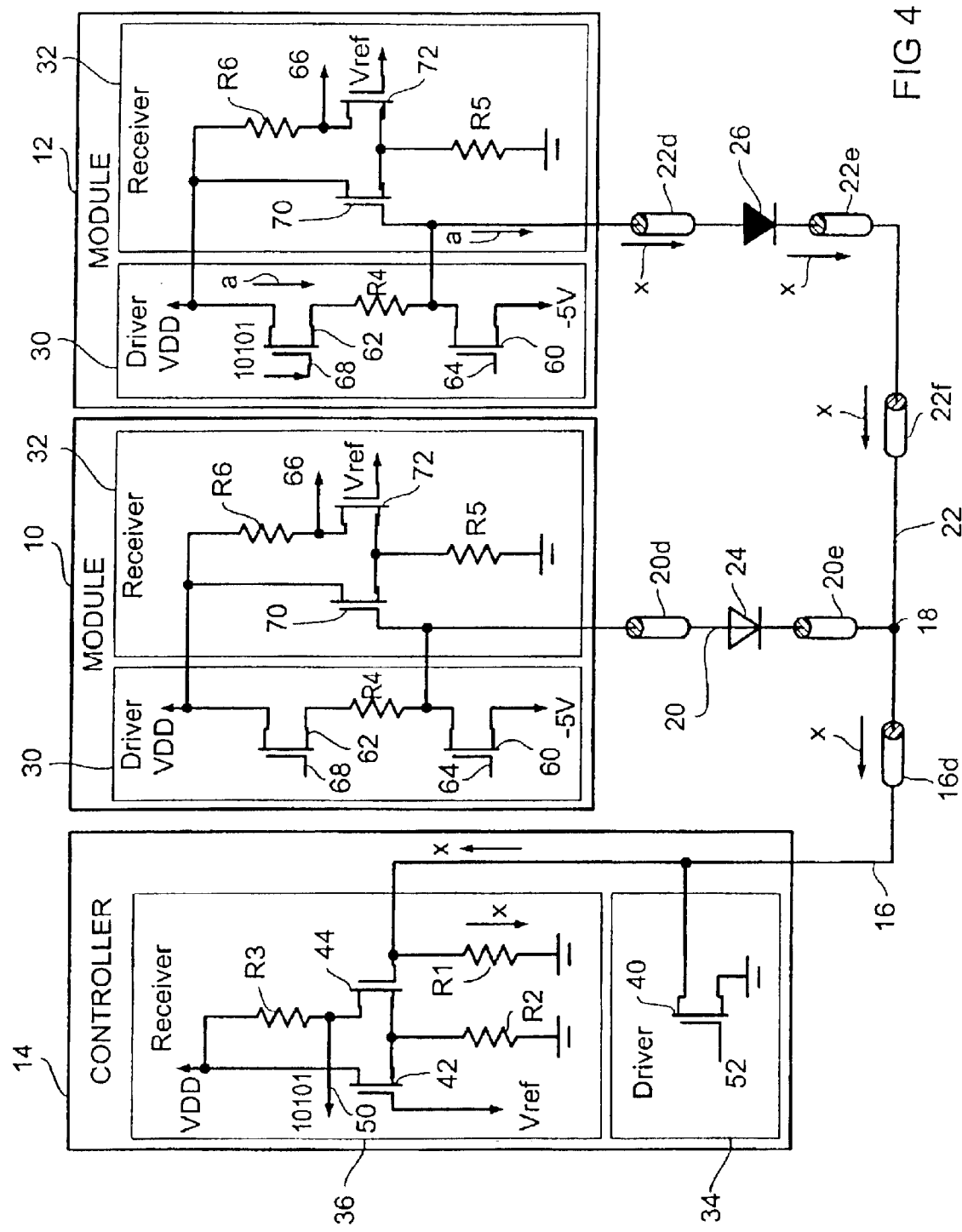
FIG. 4 shows a diagram illustrating an embodiment of the present invention for illustrating a read access.

FIG. 4 is a more-detailed diagram of an embodiment of an inventive memory system. The memory system comprises the memory modules 10 and 12 and the memory controller 14. The memory modules 10 and 12 are connected to the memory controller 14 via sub-busses 20 and 22 and a common memory bus 16, as explained above with respect to FIG. 1. In FIG. 4, the respective line lengths of the busses are again indicated by cylindrical symbols wherein, in a real implementation, the line length 16d can be 127 mm, the line length 20d can be 12.7 mm, the line length 20e may be 2.54 mm, the line length 22d can be 12.7 mm, the line length 22e can be 2.54 mm and the line length 22f can be 15 mm. It is to be noted that the line lengths are exemplary only.

As shown in FIG. 4, each memory module 10 and 12 comprises a driver 30 and a receiver 32. Moreover, the controller 14 comprises a controller driver 34 and a controller receiver 36. The driver 30 and the receiver 32 of each memory module represent a current interface to the respective sub-bus 20 or 22. The controller driver 34 and the receiver driver 36 of the controller 14 represent a current interface to the memory bus 16.

Of the components of the drivers and receivers inside the controller and the memory modules, only those components which are useful for describing the present invention are shown.

The controller driver 34 comprises a field-effect transistor (FET) 40, the drain of which is connected to the memory bus 16 and the source of which is connected to ground. The controller receiver 36 comprises a differential amplifier having two FETs 42 and 44. The gate of the field-effect transistor 44 is connected to the common data-bus 16 and is connected to ground via a resistor R1. The sources of the field-effect transistors 42 and 44 are connected to each other and are connected to ground via a resistor R2. The gate of the FET 42 is connected to a reference voltage Vref. The drain of the FET 42 is connected to a supply voltage VDD. The drain of the FET 44 is connected to the supply voltage VDD via a resistor R3. In addition, the drain of the field-effect transistor is connected to a read-data terminal 50. The gate of the FET 40 of the controller driver 34 is connected to a write-data terminal 52.

The memory module driver 30 comprises two FETs 60 and 62 and a resistor R4 connected between the source of FET 62 and the drain of FET 60. The source of FET 60 is connected to a predetermined potential, −5 V, for example. The gate of FET 60 is connected to a control line 64. The drain of FET 62 is connected to the supply voltage VDD. The gate of FET 62 is connected to a read data line 68 by which data ("10101") to be driven via the sub-bus 22 and the memory bus 16 to the controller 14 are applied.

The receiver 32 of the memory module comprises a differential amplifier having FETs 70 and 72. The gate of FET 70 is connected to the sub-bus 22 which is also connected to the drain of FET 60 of the module driver 30. The source of FET 70 is connected to the source of FET 72 and is connected to ground via a resistor R5. The drain of the FET 70 is connected to the supply voltage VDD and the drain of the FET 72 is connected to the supply voltage VDD via a resistor R6. In addition, the drain of FET 72 is connected to a write data line 66 of the memory module.

In FIG. 4, memory module 10 represents a non-active module and memory module 12 represents an active module. Moreover, FIG. 4 shows the situation in which data "10101" are read from the memory module 12.

In this embodiment, the memory module 10 is deactivated by applying a reverse-bias of −5 V to the diode 24. This is achieved by applying an appropriate control signal over control line 64 to the gate of FET 60, so that the FET 60 is turned on and the voltage of −5 V is applied to the anode of the diode 24. Thus, FET 60 represents a negative bias switch. In the non-active module 10, an appropriate control signal is applied to the gate of FET 62 via the read data line 68 so that FET 62 is turned off.

In the active memory module 12, the data signal "10101" is applied via the read data line 68. Moreover, an appropriate control signal is applied to the gate of FET 60 via the control line 64, so that FET 60 is turned off and the reverse bias of −5 V is not applied to the diode 26. In this situation, a current flow via FET 62, resistor R4, sub-bus 22, memory bus 16 and into the receiver 36 of the controller 14 will occur when the FET 62 is turned on by the data applied via the read data line 68. This current flow is indicated by arrows x in FIG. 4. This current causes the diode 26 to be forward biased and causes a voltage drop over the resistor R1 of the controller receiver, so that the data driven over the memory bus are received on the read data line 50.

Figure 5:
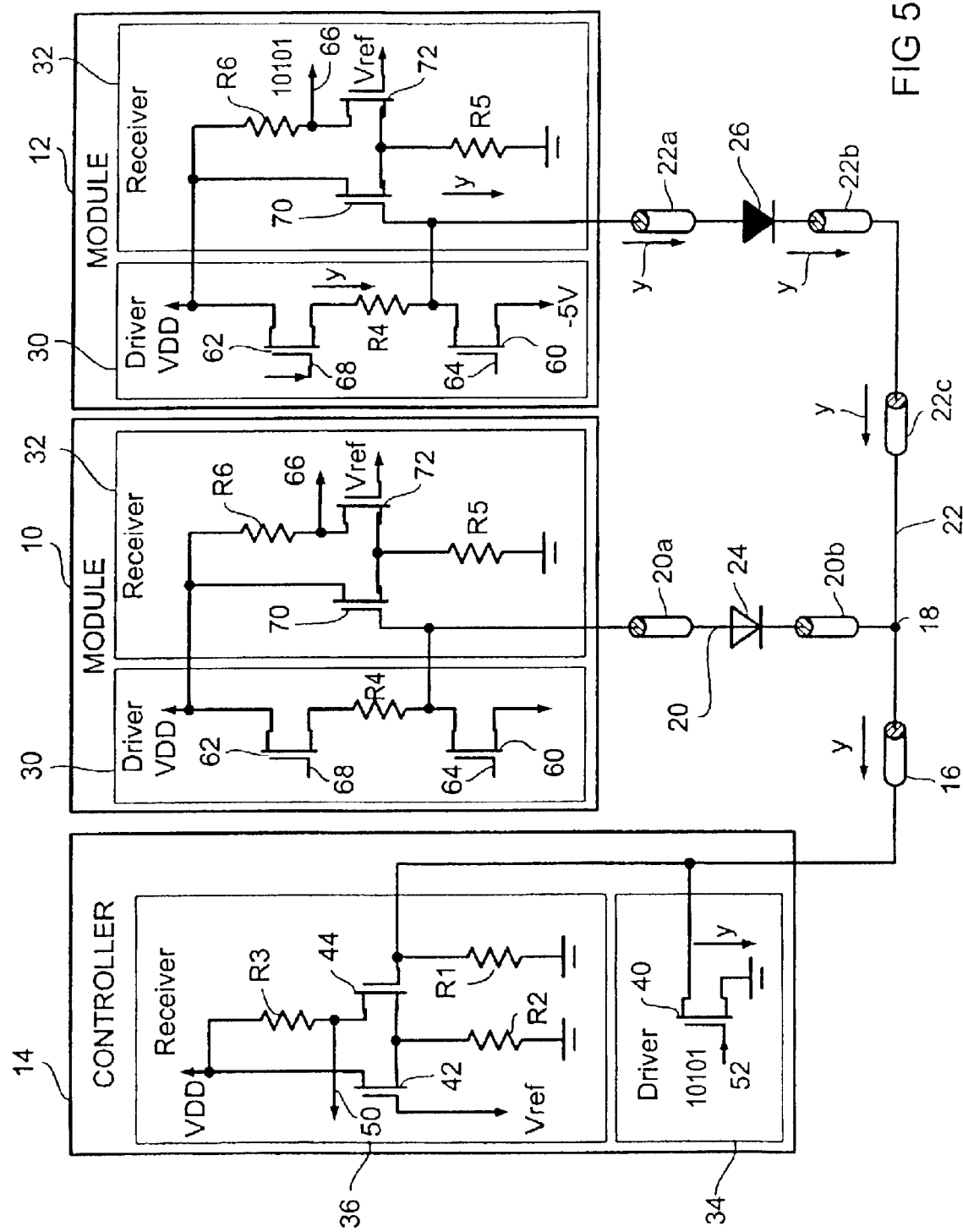
FIG. 5 shows a diagram showing the embodiment of FIG. 4 for a write access.

The situation when writing data into the active module 12 is shown in FIG. 5. Again, the module 10 is the non-active memory module and corresponding control signals are applied to the gates of FETs 60 and 62 via the control line 64 and the read data line 68, respectively. The memory module 12 represents the active module and, therefore, the FET 60 is turned off by an appropriate control signal applied via control line 64. Contrary thereto, the FET 62 is turned on by applying an appropriate control signal to the gate thereof via the read data line 68, for example, by continuously applying a logic "1" to the gate of FET 62. At the same time, data to be written into the memory module 12 are applied via the write data line 52 to the gate of transistor 40 of the controller driver 14. Again, in FIG. 5, the data are indicated by a binary string "10101".

Each time the FET 40 is turned on by the data applied to the gate thereof, a current flow is effected through FET 62, resistor R4, sub-bus 22, memory bus 16 and FET 40. This current flow is indicated by arrows y in FIG. 5. By this current flow, the diode 26 is forward-biased. Moreover, the potential at the drain of FET 72 is changed due to this current, so that the data "10101" are received on write data line 66.

It is clear from the above description that the present invention provides a memory system having a switchable data bus with diode isolation wherein the receiver 36 and driver 34 of the controller 14 and the receiver 32 and the driver 30 of the respective active memory module provide for a current interface for driving and receiving data via the bus system. In view of the fact that the reverse-biased diodes of the non-active memory modules have a low capacitance, the read/write signal path to the respective active memory module becomes similar to a point-to-point connection.

In view of the large diode cross voltage of commercial diodes (for low power Skottky diodes it is about 0.5 V at a current of 10 mA), it is preferred to implement the current driver at the controller and memory chip as open drain drivers or open collector drivers. Moreover, the current drivers can be implemented as an emitter coupled logic.

Figure 6:
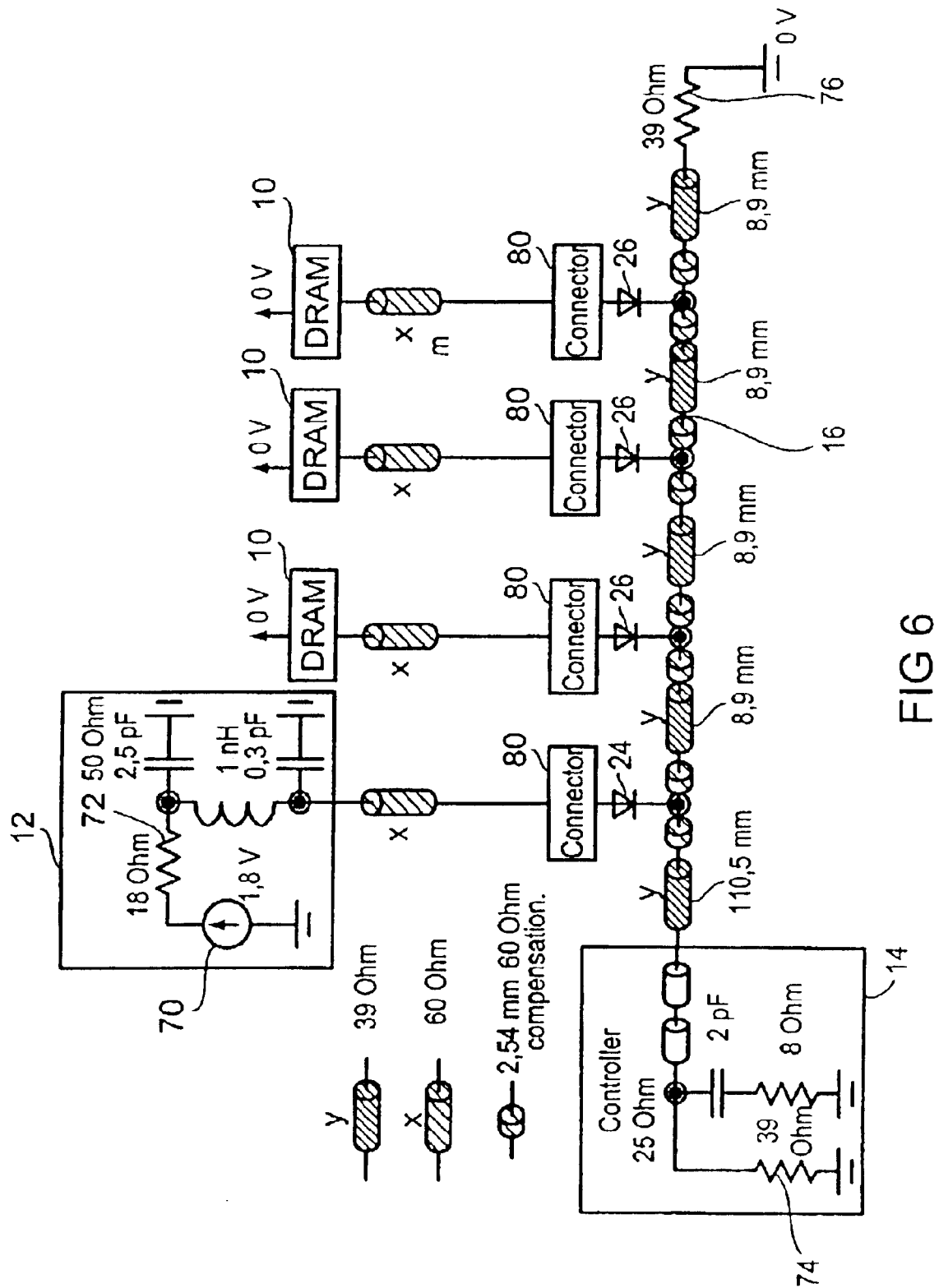
FIG. 6 shows a diagram showing an alternative embodiment of the present invention and illustrating a read access.
Figure 7:
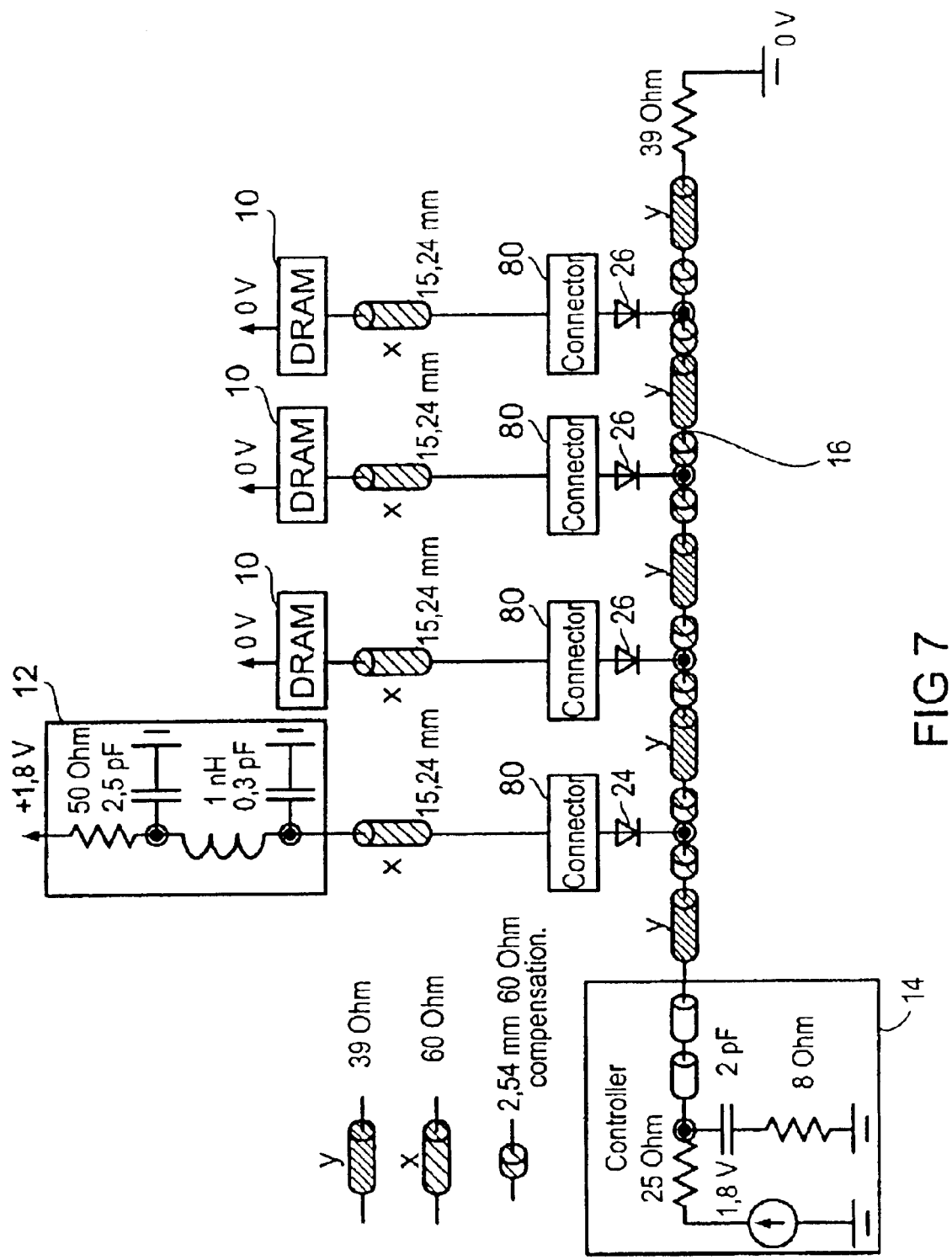
FIG. 7 shows a diagram of the embodiment of FIG. 6 illustrating a write access.

An alternative embodiment of the invention which does not require a negative bias (of −5.0 V, for example) is shown in FIGS. 6 and 7.

FIG. 6 shows the situation for reading data from a module 12 while three non-active modules 10 are shown. The diode 24 associated with the active module 12 is forward biased by causing a voltage drop across the diode 24 at least in the order of the on-state-voltage thereof. In FIGS. 6 and 7, the memory module 12 is modelled as having a capacitance of 2.8 pF and an inductance of 1 nH. The forward biasing of diode 24 is achieved by a power supply 70 causing a current flow through resistors 72 and 74. A resistor 76 is for terminating the memory bus 16 for improving the signal integrity by preventing ringing and the like. A corresponding termination resistor can be provided for the memory bus of the embodiment shown in FIGS. 4 and 5.

The diodes 26 associated with the deactive modules 10 (DRAMs in the embodiment shown) are not biased and, therefore, the modules 10 are isolated from the data bus 16. Connectors 80 shown in FIG. 6 may be usual slot connectors for connecting the memory modules to a board on which the controller is provided.

In FIG. 7, a write access to the memory module 12 is shown. Now, appropriate voltages to place the diode 24 in an on-state are applied by the controller 14 and the module 12. Contrary thereto, the diodes 26 are reverse biased by the voltage applied by the controller 14, so that the modules 10 are isolated from the data bus 16.

Figure 8A:
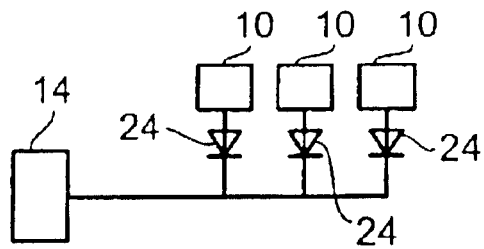
FIGS. 8a to 8d show different memory topologies making use of the present invention.
Figure 8B:
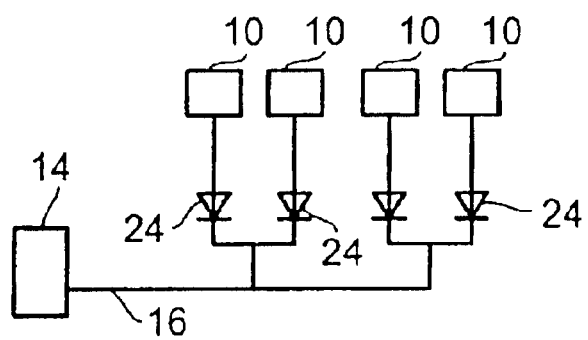
Figure 8C:
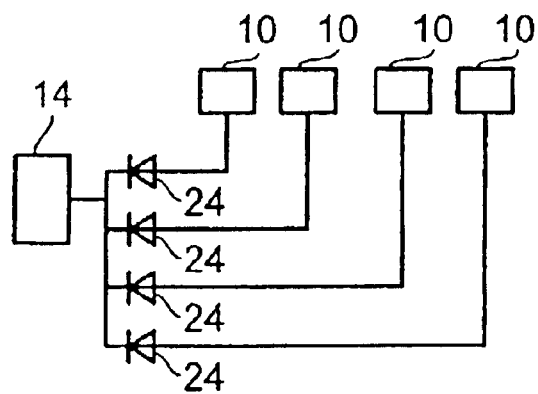
Figure 8D:
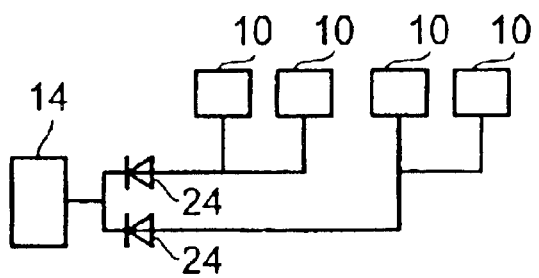

Different memory topologies making use of the present invention are shown in FIGS. 8a to 8d. A preferred configuration in which the memory modules 10 are arranged in line and in which one sub-bus is provided for each module is shown in FIG. 8a. According to the topology of FIG. 8b, the memory bus 16 branches into two intermediate buses, which branch into four sub-busses each of which comprises a respective diode 24. FIG. 8c shows a topology comparable to that of FIG. 2 which is not as preferred as the topology of FIG. 8a in view of the resulting line lengths of the sub-busses. According to FIG. 8d, sub-buses, in which respective diodes 24 are provided, are connected to a plurality of two memory modules 10. Thus, according to the invention, each diode can be associated with a plurality of memory modules. However, the data rate which can be obtained decreases with the number of modules associated with each diode.

The above embodiments of the present invention have been described making reference to data busses and data sub-busses of a memory topology. It is, however, clear that the present invention can also be used in connection with other busses of a memory system, busses for communicating control signals and command signals, for example.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A memory system comprising:
   a memory controller;
   a plurality of memory modules;
   a memory bus connected to the memory controller and branching into a plurality of sub-busses, each of which is connected to a memory module, wherein
   a sub-bus has a diode associated therewith for isolating a memory module connected to that sub-bus from the memory bus.

2. The memory system according to claim 1, wherein the diode is connected between a first portion and a second portion of a respective sub-bus.

3. The memory system according to claim 1, further comprising means for applying a reverse bias to the diode.

4. The memory system according to claim 1, further comprising a reverse-bias switch for applying a reverse-bias to the diode.

5. The memory system according to claim 1, further comprising a forward-bias switch for applying a forward-bias to the diode.

6. The memory system according to claim 5, wherein the forward-bias switch is controlled by data to be read from the memory module and/or by data to be written to the memory module.

7. The memory system according to claim 6, wherein the forward-bias switch comprises a field-effect transistor, the gate of which is connected to a data line of the memory module, the drain of which is connected to a forward-bias source and the source of which is connected to the diode.

8. The memory system according to claim 1, wherein the memory bus is a data bus.

* * * * *